(12) United States Patent
Singer et al.

(10) Patent No.: US 12,611,832 B2
(45) Date of Patent: Apr. 28, 2026

(54) MOLD SEGMENT IRREGULAR WEAR AND NOISE COUNTERMEASURE

(71) Applicant: Bridgestone Americas Tire Operations, LLC, Nashville, TN (US)

(72) Inventors: Adam D. Singer, Massillon, OH (US); David M. Severyn, North Canton, OH (US); Andrew C. Budd, Clinton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 903 days.

(21) Appl. No.: 17/439,542

(22) PCT Filed: Feb. 5, 2020

(86) PCT No.: PCT/US2020/016747
§ 371 (c)(1),
(2) Date: Sep. 15, 2021

(87) PCT Pub. No.: WO2020/190402
PCT Pub. Date: Sep. 24, 2020

(65) Prior Publication Data
US 2022/0194037 A1     Jun. 23, 2022

Related U.S. Application Data

(60) Provisional application No. 62/821,095, filed on Mar. 20, 2019.

(51) Int. Cl.
*B29D 30/06* (2006.01)
*B60C 11/03* (2006.01)
*B60C 11/12* (2006.01)

(52) U.S. Cl.
CPC ...... *B29D 30/0606* (2013.01); *B60C 11/1236* (2013.01); *B60C 11/1259* (2013.01);
(Continued)

(58) Field of Classification Search
CPC .... B29D 2030/0606; B29D 2030/0616; B29D 2030/0613; B60C 11/1236; B60C 11/1272; B60C 2011/1286
See application file for complete search history.

(56) References Cited

U.S. PATENT DOCUMENTS 5,211,781 A * 5/1993 Adam ................. B60C 11/0306
152/DIG. 3
5,261,804 A    11/1993 Jachowsky
(Continued)

FOREIGN PATENT DOCUMENTS

DE    102010037785 A1    3/2012
EP        1798064 A1 * 6/2007 .............. B60C 11/11
(Continued)

OTHER PUBLICATIONS

Gent, Alan Neville and Walter, Joseph D., "Pneumatic Tire" (2006). Department of Mechanical Engineering. Paper 854. p.664 http:// ideaexchange.uakron.edu/mechanical_ideas/854 (Year: 2006).*
(Continued)

*Primary Examiner* — John J DeRusso
*Assistant Examiner* — Alexander D Booth
(74) *Attorney, Agent, or Firm* — Shaun J. Fox; J. Gregory Chrisman

(57)        ABSTRACT

A tire mold segment containing a mold surface with a plurality of groove forming and sipe forming protrusions arranged to form tread portions of tires. At the end faces of the tire mold segment, the portion of sipe forming protrusions with an end that terminates at or near the mold segment end face have an increased width to provide a countermeasure against irregular tread wear and tire noise. The sipe forming protrusions having an end that terminates at or near a tire mold segment end face have a width of about 0.7 mm or more. The remaining sipe forming protrusions positioned
(Continued)

on the tire mold segment can a reduced thickness to accommodate high sipe density tread designs.

10 Claims, 4 Drawing Sheets

(52) U.S. Cl.
CPC .. *B60C 11/1272* (2013.01); *B29D 2030/0613* (2013.01); *B29D 2030/0616* (2013.01); *B60C 2011/0346* (2013.01); *B60C 2011/1286* (2013.01)

(56) References Cited

U.S. PATENT DOCUMENTS

| | | | |
|---|---|---|---|
| 6,264,453 B1 | 7/2001 | Jacobs et al. | |
| 6,378,583 B1 * | 4/2002 | Fontaine | B60C 11/0302 |
| | | | 152/209.21 |
| 6,564,840 B2 | 5/2003 | Kleinhoff et al. | |
| 6,826,819 B1 | 12/2004 | Sinfield | |
| 7,467,652 B2 | 12/2008 | Knispel et al. | |
| 2003/0101851 A1 * | 6/2003 | Domange | B29D 30/0606 |
| | | | 76/101.1 |

| | | | |
|---|---|---|---|
| 2005/0150582 A1 | 7/2005 | Matsumura | |
| 2007/0151646 A1 * | 7/2007 | Ito | B60C 11/12 |
| | | | 152/DIG. 3 |
| 2016/0151988 A1 * | 6/2016 | Gaebelein | B23K 26/0648 |
| | | | 219/121.72 |
| 2018/0147748 A1 | 5/2018 | Jenkins et al. | |
| 2018/0200974 A1 | 7/2018 | Gueugneau | |

FOREIGN PATENT DOCUMENTS

| | | | | |
|---|---|---|---|---|
| EP | 2517867 | A1 | | 10/2012 |
| JP | H10272906 | A | | 10/1998 |
| JP | 2009255734 | A | * | 11/2009 |
| KR | 1020040091928 | A | | 11/2004 |
| KR | 101509479 | B1 | | 4/2015 |
| WO | 2009064068 | A1 | | 5/2009 |
| WO | 2018015630 | A1 | | 1/2018 |

OTHER PUBLICATIONS

Rodewald. EP1798064A1. 2007. ESpaceNet Machine Translation. (Year: 2025).*

Suzuki. JP2009255734A. 2009. Machine Translation via ESpaceNet. Generated on Jul. 29, 2025 (Year: 2009).*

* cited by examiner

Mold Segment
End Face

Mold Segment
End Face

Mold Segment
End Face

Mold Segment
End Face

MOLD SEGMENT IRREGULAR WEAR AND NOISE COUNTERMEASURE

TECHNICAL FIELD

The present disclosure relates to tire mold segments useful for preparing pneumatic tires and, in particular, to tire mold segments and pneumatic tires prepared by the same characterized in that the mold segments contain selective sipe forming protrusions having increased width at or near mold end faces.

BACKGROUND

Pneumatic tires contain a tread portion that generally includes circumferential and lateral grooves that define landing portions such as tire lugs or blocks that contact the road surface. The placement and design of the grooves and defined landing portions impact tire performance and are selected to meet certain characteristics. Tires also often include many sipes positioned on the tread. Sipes are thin grooves or slits formed into the tire tread to improve the gripping performance of the tire. For instance, the formation of sipes increases the overall number of edges in a tire tread, which can improve the gripping action of the tread surface.

With the design of high sipe density tread patterns for tires, the width of sipes has decreased. To form a sipe, a metal blade is generally used on the surface of a tire mold. Multiple tire mold segments are used to form the circumferential tread portion of a tire, which form mold segment part lines on a tire surface where the segments meet during the molding process. At mold segment part lines, irregular tread wear can occur and induce harmonic noise during operation. Irregular wear can result of removing full depth sipes at mold segment ends and replacing them with shorter depth cast features which stiffen the tread block at segment end locations.

Eliminating full depth sipes at mold segment ends provides mold sipe durability throughout production life of the mold. The thin walled blades for forming sipes are subject to force and stress during manufacturing and full depth blades can become damaged and shear off over time. Reduction of the sipe blade height at mold segment ends can result in more durable blades that form thin width sipes at less than full depth. Because there is a desire for high density sipe tread and sipes at full depth, the present invention provides a solution of a tire mold that countermeasures irregular wear and resulting harmonic noise.

SUMMARY

In a first aspect, disclosed is a pneumatic tire molded with a tread molding body comprising a tire mold segment, the tire mold segment having an inner mold surface for forming a tread surface portion of the tire, the inner mold surface including a plurality of sipe forming protrusions that form sipes on the tread surface portion, each sipe forming protrusion of the plurality of sipe forming protrusions having a length, a height and a width, the height being relative to the inner mold surface that the sipe forming protrusions extend from. The tire mold segment further contains a first mold segment end face and a second mold segment end face, the first mold segment end face and the second mold segment end face arranged at opposite ends of the inner mold surface such that a tread forming portion of the inner mold surface terminates at the first and second mold segment end faces, and wherein an edge sipe forming protrusion of the plurality of sipe forming protrusions has a first end and a second end, the first end or the second end of the edge sipe forming protrusion terminates at or near the first mold segment end face, and the edge sipe forming protrusion has a width in the range of about 0.7 to about 1.2 mm.

In an example of aspect 1, the edge sipe forming protrusion is a full-depth protrusion.

In an example of aspect 1, the edge sipe forming protrusion has a width greater than a plurality of interior sipe forming protrusions positioned on the inner mold surface, wherein each sipe forming protrusion of the plurality of interior sipe forming protrusions has a first end and a second end arranged between and does not terminate at or near the first and second mold segment end faces.

In an example of aspect 1, the edge sipe forming protrusion has a constant width along a length of the edge sipe forming protrusion.

In another example of aspect 1, the edge sipe forming protrusion has a height of 3 to 6 mm or 4 mm or more.

In another example of aspect 1, the first end or the second end of the edge sipe forming protrusion terminates along the first mold segment end face.

In another example of aspect 1, the first end or the second end of the edge sipe forming protrusion terminates at a distance of 2 cm or less or 1 cm or less from the first mold segment end face.

In another example of aspect 1, the inner mold surface includes a plurality of groove forming protrusions for forming grooves on the tread surface portion of the pneumatic tire and a plurality of land forming recesses for forming land portions on the tread surface portion of the pneumatic tire.

In another example of aspect 1, the plurality of groove forming protrusions have a height and the height of the edge sipe forming protrusion is about 60% to 100%, or 80% or more, of the height of the plurality of groove forming protrusions.

In another example of aspect 1, the edge sipe forming protrusion is a blade, for example a metal blade.

In another example of aspect 1, the first end or the second end of the edge sipe forming protrusion intersects with a groove forming protrusion. The opposite end of the edge sipe forming protrusion terminates at or near an end face of the tire mold segment and is not in contact with a groove forming protrusion of the plurality of groove forming protrusions.

In another example of aspect 1, the width of a portion of the plurality of sipe forming protrusions is about 0.6 mm or less. In one example, the each of the portion of the plurality of sipe forming protrusions having a width of about 0.6 mm or less has a first and second end not in contact or terminating at a tire mold segment end face.

In a second aspect, there is a tire mold segment that includes an inner mold surface and a first and second mold segment end face, the inner mold surface, for example for forming a tread portion of a pneumatic tire, terminates at the first and second mold segment end faces. The tire mold segment also includes an edge sipe forming protrustion having a width in the range of about 0.7 to about 1.2 mm, the edge sipe forming protrusion also having a first end and a second end, the first end or the second end of the edge sipe forming protrusion terminates at or near the first mold segment end face. Included on the inner mold surface is one or more interior sipe forming protrusions having a width in the range of about 0.6 mm or less, wherein the one or more interior sipe forming protrusions have a first end and a second end positioned away from the end faces of the tire mold segment.

In an example of aspect 2, the edge sipe forming protrusion has a height in the range of about 3 to about 6 mm or 4 mm or more.

In another example of aspect 2, the first end of the edge sipe forming protrusion terminates at the first mold segment end face and the second end of the edge sipe forming protrusion terminates into a groove forming protrusion.

In another example of aspect 2, the inner mold surface includes two or more edge sipe forming protrusions, each of the edge sipe forming protrusions having an end that terminates at or near the first mold segment end face, for example, at a distance of 2 cm or less or 1 cm or less from the first mold segment end face.

In another example of aspect 2, the each of the two or more edge sipe forming protrusions has a width in the range of about 0.7 to about 1.2 mm.

In another example of aspect 2, the interior sipe forming protrusion has a first end and a second end, the first end and the second end terminates into one or more groove forming protrusions.

In another example of aspect 2, the inner mold surface further includes a plurality of land forming recesses, the edge sipe forming protrusion positioned in a land forming recess of the plurality of land forming recesses.

In another example of aspect 2, the land forming recess has a first border portion that terminates along the first mold segment end face and a second border portion that is formed by a groove forming protrusion.

In another example of aspect 2, the first end of the edge sipe forming protrusion terminates at the first mold segment end face and the second end of the edge sipe forming protrusion terminates into the groove forming protrusion that forms the second border portion of the land forming recess.

In another example of aspect 2, there is a tire having a tread surface portion formed by the tire mold segment. The tread surface portion can include one or more mold segment part lines, wherein the mold segment part lines include a sipe having a width of about 0.7 to about 1.2 mm. The tread surface portion contains sipes of different thicknesses.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims. It is to be understood that both the foregoing general description and the following detailed description are merely exemplary, and are intended to provide an overview or framework to understanding the nature and character of the claims.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more or less than 25. In an example, such a range defines independently 5 or more, and separately and independently, 25 or less.

The present disclosure relates to a tire mold segment design with selective sipe forming protrusion features and the assembly of those tire mold segments for forming a pneumatic tire having a tread design. The tire mold segments preferably produce a tire having a tread design that reduces irregular wear and tire noise of the tread portion of a pneumatic tire. The tire mold segment design includes the selective use of one or more sipe forming protrusions having increased width at or near mold segment end faces to provide a durable tire mold segment. Sipe forming protrusions extending from a mold surface and having at least one end terminating at or near the mold segment end face have increased width to improve structural integrity of the protrusions at a range of sipe depths (or protrusion heights), while optionally providing a tire tread design with a high density of thinner sipes arranged away from or near mold segment end faces. The selective sipe forming protrusions at or near mold segment end faces can have the same height as the remaining thinner sipe forming protrusions of the mold segment.

The present disclosure includes pneumatic tires having tread portions formed by tire mold segments of the present invention. The mold segment part lines that are formed at multiple locations on a tire tread surface can include tread elements having sipes with increased thickness or width at a range of depths. The selectively wider sipes at the mold segment part lines can be any suitable shape and can be adjacent sipes having a reduced width, for example, all remaining sipes on the tire tread surface. In other embodiments, the present disclosure includes tire molds or segments for forming a pre-cured tread, which is a vulcanized tread rubber member that is used in a retreaded tire or the like. While not illustrated, the disclosed tire or tread portion is produced using the tire mold segments of the invention. The mold segments are joined together to form a tread molding body that includes a plurality of mold segments aligned in a circumferential direction of the mold.

Figure 1:
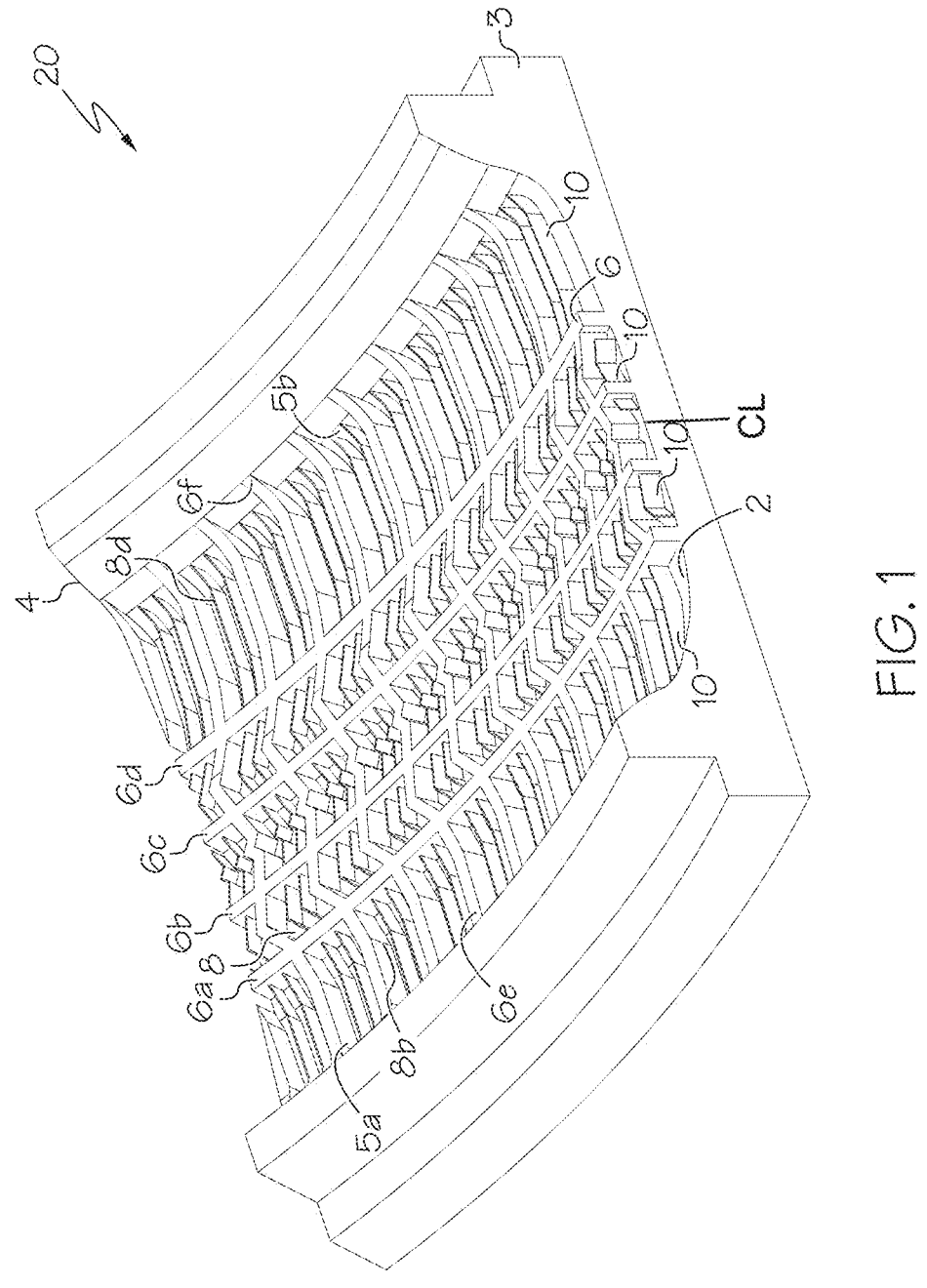
FIG. 1 is a perspective view of a tire mold segment according to one or more embodiments of the present invention.

FIG. 1 illustrates a tire mold segment 20 in accordance with the present invention and that can be joined with other tire mold segments of the same design to form a complete tire mold. As shown, the tire mold segment 20 includes an general inner mold surface 2 for forming a tread portion of a pneumatic tire, for example, the ground-contacting surface of the tread. The tire mold segment 20 is part of a tire mold assembly (e.g., ring shaped, not shown) that includes multiple mold segments all having the same or similar design for forming the entire circumferential tread portion of a pneumatic tire. The tire mold segments 20 can be inside a holder or outer housing that forms an outer hull of the mold segments.

As shown in FIG. 1, the tire mold segment 20 has a first mold segment end face 3 and a second mold segment end face 4 for abutting the end face of another mold segment to form a tire mold. The end faces 3, 4 are linear, flat faces oriented in the radial direction and perpendicular to the tread portion of the tire to be formed by the mold segment 20. Radial is used to mean the direction radially outward from the rotational axis of a tire. In operation, the end faces 3, 4 abut against other tire mold segments to form a tire mold assembly for completing the entire tread portion of a tire. At locations where end faces of two tire mold segments meet, mold segment part lines can be formed on the surface of a tire. A formed tire can have multiple mold segment part lines, for example, in the range of 4 to 20 mold segment part lines.

Alternatively, not shown in FIG. 1, the mold segment end faces 3, 4 can have a non-linear shape, for example, curved, puzzle-cut, zig-zag or sinusoidal. Non-linear shaped mold end segment faces can be utilized to reduce the amount of components of the inner mold surface that interact, terminate or otherwise intersect with the end faces of the tire mold segment. For example, a non-linear cut (e.g., a zig-zag cut) to form an end face of the tire mold segment can be made to avoid one or more groove forming or sipe forming protrusions from intersecting with or terminating at a mold segment end face. Complex inner mold surfaces with many tread forming components like groove and sipe forming protrusions may result in one or more components terminating at or near one or both end faces of a tire mold segment. Dissecting tread forming components can make mold segment part lines on a tire surface more noticeable and potentially form irregular portions in a tire tread pattern.

Tread forming components positioned on and extending from the inner mold surface 2 can include one or more groove forming protrusions 6, for example, lateral or circumferential groove forming protrusions. The tread portion of pneumatic tires often contains one or more or a plurality of circumferential grooves and one or more or a plurality of lateral grooves as part of the tread pattern. FIG. 1 shows multiple groove forming protrusions 6 arranged in the circumferential and lateral directions relative to the tread portion of a tire. As shown, there are four primary circumferential groove forming protrusions 6a, 6b, 6c, 6d that extend upward along the inner mold surface 2 from the first end face 3 to the second end face 4. The groove protrusions, when paired with similar groove protrusions of other mold segments, form grooves in a tire tread that extend around the entire circumference of a tire. In the illustrated example, groove forming protrusions 6a, 6b are arranged on a tread half portion centering on mold segment plain CL, and the groove forming protrusions 6c, 6d are arranged on the other tread half portion centering on mold segment plain CL. The groove forming protrusions 6 can be any suitable shape, for example, a linear, curved, zig-zag, sinusoidal, or random shape. The groove forming protrusions 6 can have a width that is constant along the entire or a portion of its length as shown. Alternatively, the groove forming protrusions can have a random width with the presence of wider and thinner sections along the length of the protrusion.

Groove forming protrusions 6 extend upward from the inner mold surface 2 and have a height that is measured from the base of the protrusion 6 at the inner surface 2 to the top of the protrusion furthest from the base. The groove forming protrusions can have a height in the range of about 1 to about 10 millimeter (mm), about 2 to about 8 mm, or about 3 to about 7 mm, or about 3 mm or more, about 4 mm or more, about 5 mm or more or about 6 mm or more. The height of the groove forming protrusions can be continuous along the length of the protrusion, for example, from one end face to an opposite end face or a first groove protrusion end to a second groove protrusion end. The height of the groove forming protrusion 6 corresponds to the depth of a groove formed in the tread portion of a pneumatic tire and therefore the height ranges for the protrusions 6 are equal to groove depths of a pneumatic tire formed by use of the tire mold segment. Groove width also refers to and is related to the width of the groove forming protrusions.

The groove forming protrusions 6 can be interlinked to form landing portions or land forming recesses 8 within the lattice pattern made the groove forming protrusions, optionally with shoulder end faces. Landing portions can include tire lugs or blocks on a pneumatic tire tread portion for contacting a road surface and that correspond to the shape and dimensions of the land forming recesses 8 of the tire mold segment 2. The land forming recesses 8 can be entirely bordered by one or more groove forming protrusions 6 or partially bordered by such protrusions 6. For example, one, two or three sides of a land forming recess can be formed by groove forming protrusions. Land forming recesses 8 can include those that form shoulder portions of a tread portion of a pneumatic tire.

Figure 2:
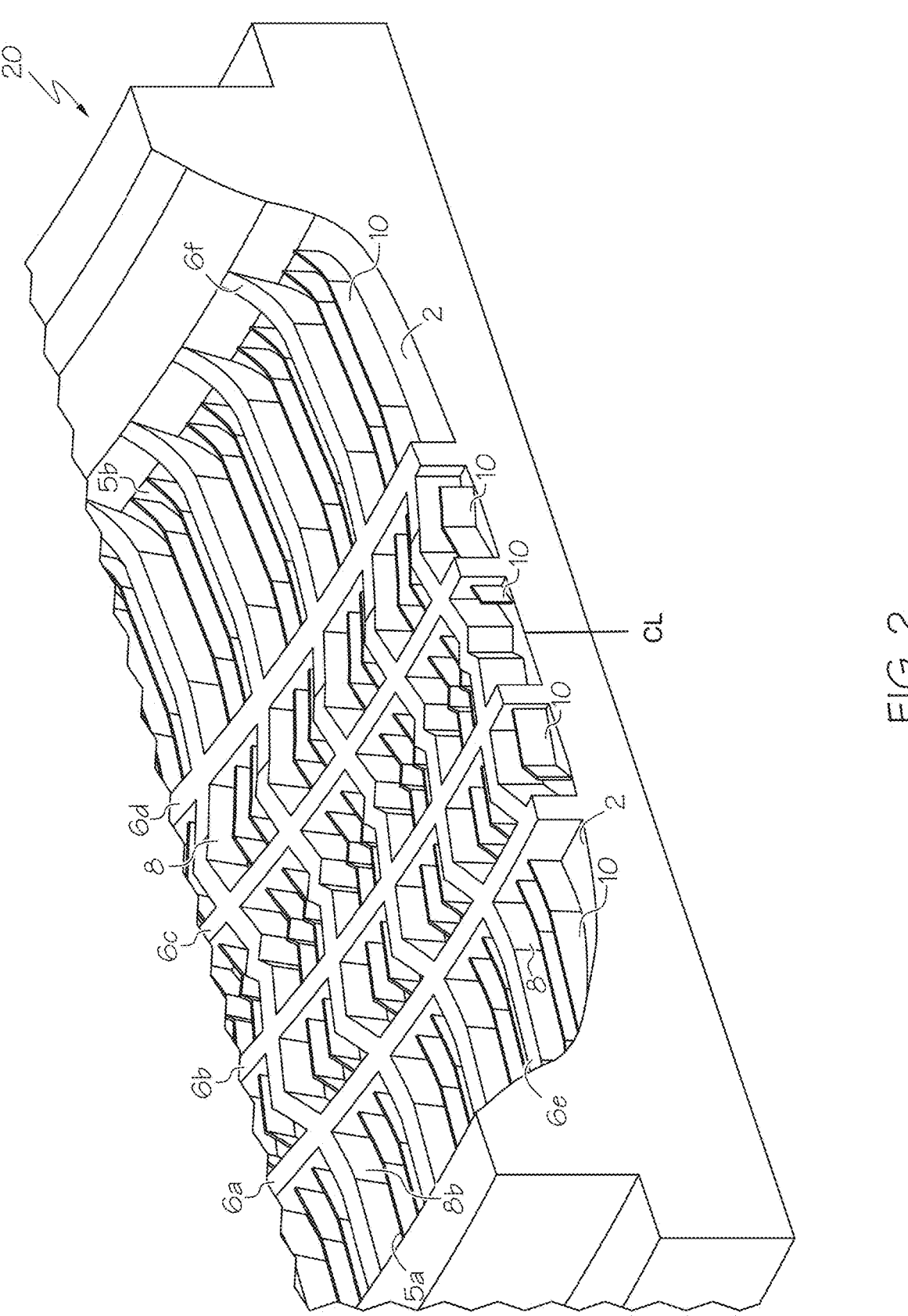
FIG. 2 is a perspective view of a portion of the tire mold segment of FIG. 1.

Within the land forming recesses, additional components, for example, other groove forming protrusions, can be present. As shown in FIGS. 1 and 2, the shoulder forming recesses 8b, 8d are bordered by a primary circumferential groove forming protrusion 6a, 6d, two lateral groove forming protrusions 6e, 6f, and at lease one shoulder end face 5a, 5b of the tire mold segment 20. In one or more embodiments, additional lateral groove forming protrusions can extend into land forming recesses 8b, 8d from a border edge of the recess, for instance, formed by the shoulder end faces 5a, 5b, and terminate within the recess 8b, 8d before contacting another border edge of the recess. Lateral groove forming protrusions, such as those that form a border edge in the shoulder recesses, can have a height less than the circumferential groove forming protrusions (e.g., 6a, 6b) for example, in the range of about 1 mm to about 6 mm, or about 5 mm or less, about 4 mm or less or about 3 mm or less. In general, the height of a lateral groove forming protrusion is the same or similar to the circumferential groove forming protrusions. Widths of lateral groove forming protrusions can also be the same or similar to other protrusions extending from the inner mold surface 2, e.g., a circumferential groove forming protrusion.

FIGS. 1 and 2 also show multiple sipe forming protrusions 10 arranged along the inner mold surface 2. The sipe forming protrusions 10 function to form sipes on the tread portion of a pneumatic tire. The sipe forming protrusions 10 can be thin pieces that extend from surface 2, for example, blades (metal blades). The protrusions can be formed by any conventional method, for example, the protrusions can be welded, cast, printed, attached or secured (e.g., adhesive) to the tire mold segment. The sipe forming protrusions 10 have a height as measured from their base as it extends from the inner mold surface 2 to the top of the protrusion (i.e. the highest portion of the sipe protrusion). The height of the sipe forming protrusion 10 corresponds to the depth of the corresponding sipe formed in the tread portion of a pneumatic tire.

Tire mold end faces can be designed to create a boundary line that extends along the mold while avoiding or minimizing intersecting with sipe forming protrusions. Intersection with a sipe forming protrusion can further be avoided by removing a sipe protrusion or offsetting it from an end face, although these steps can affect tire performance and capabilities, for example, wear resistance, on-ice or on-snow performance that is expected to improve by providing sipes. Thus, to ensure consistent sipe designs and patterns, some sipe forming protrusions can intersect with and have one or more ends that terminate at the end face of the tire mold segment. Sipe forming protrusions 10 can also have an end that terminates near the end face of the tire mold segments but do not intersect or abut against an end face. These sipe forming protrusions at or near the end face of the tire mold segment are subject to moment forces and stresses during operation that can affect structural integrity and performance of the protrusions over time. The height and thickness (or width) of the sipe forming protrusions 10 also affects their ability to withstand long term operating conditions and prevent breakage or deformation. Reduction of height while maintaining a thin width can improve the strength of the protrusions but half-depth or reduced depth sipes at the end faces can affect tire wear resistance and resulting rotational noise at mold segment part lines on a tire. For example, reduced depth sipes will wear away before surround sipes of greater depth and irregular, flat surfaces on the tire tread can form during operation.

As illustrated in FIGS. 1 and 2, the sipe forming protrusions 10 that terminate at or near the end face of the tire mold segment 20 can have the same or similar height as the remaining sipe forming protrusions arranged on the inner mold surface 2. In one or more embodiments, the height of the sipe forming protrusion 10 can be in the range of about 1 to about 10 millimeter (mm), about 2 to about 8 mm, or about 3 to about 7 mm, or about 3 mm or more, about 4 mm or more, about 5 mm or more or about 6 mm or more. In one or more embodiments, the height of the sipe forming protrusion 10 can be about 4 mm to about 8 mm, about 4 mm to about 6 mm, or about 8 mm or less, about 7 mm or less or about 6 mm or less. In one or more embodiments, the height of the sipe forming protrusions can be constant along the entire length of the protrusion. Alternatively, the height of the sipe forming protrusions can vary along the length of the protrusion. In the event the height is not constant, the above height dimensions can be defined as average height along the length of a sipe forming protrusion.

The plurality of sipe forming protrusions 10 dispersed over the inner mold surface 2 can each have the same or similar height such that all sipes formed by the tire mold segment in a pneumatic tire have about the same depth. In one or more embodiment, portions of the plurality of sipe forming protrusions 10 can have a height that varies from other portions of protrusions to result in portions of sipes having an increased or reduced depth. At or near one or both of the end faces 5a, 5b of the tire mold segment, the sipe forming protrusions 10 can have a height in the range of about 3 to about 6 or 7 mm or about 60 percent or more of the height of an adjacent groove forming protrusion or the average height of the plurality of groove forming protrusions. In another example, the sipe forming protrusions (e.g., at or near an end face) can have a height in the range of about 60 to about 100 percent, about 70 to about 95 percent or about 75 to about 90 percent of the average height of the plurality of groove forming protrusions 6. In another example, the sipe forming protrusions can have a height of about 60 percent or more, about 70 percent or more, about 80 percent or more or about 90 percent or more of the maximum height of any of the plurality of groove forming protrusions.

Each of the plurality of sipe forming protrusions 10 also has a width. The width of the sipe forming protrusions 10 can be constant along their height or vary depending on design of the protrusion. For example, protrusions 10 can include a three-dimensional component, expanded section, rib or curved portion. In one or more embodiments, the width dimension of a sipe forming protrusion can be defined as the average width along the height and length of the protrusion. In other embodiments, the width dimension of a sipe forming protrusion can be specified as the width at a particular location along it height and length, for example, at its thinnest point or at the top of the protrusion.

The width of a sipe forming protrusion 10 can be in the range of about 0.1 mm to about 1.2 mm, about 0.2 mm to about 1 mm, or about 0.3 mm to about 0.8 mm, or about 0.4 mm, about 0.5 mm, about 0.6 mm or about 0.7 mm. In one or more embodiments, the width of a sipe forming protrusion 10 can be about 0.6 mm or less, about 0.5 mm or less, or about 0.4 mm or less, for instance, as measure as the average width along the height and length of a sipe protrusion or at the thinnest portion of a sipe protrusion.

The width of sipe forming protrusions 10 at or near one or both end faces of the tire mold segment can be about 0.7 to about 1.2 mm. As used herein, sipe forming protrusions at or near one or both end faces of the tire mold segment can be referred to as edge sipe forming protrusions. As mentioned above, the edge sipe forming protrusions experience mechanical stresses, bending, torque, shear and the like during operation as the tire mold segment is brought into contact under pressure and heat conditions for forming a tire. Thicknesses above about 0.7 mm or more for sipe forming protrusions at or near the end faces of the mold segment improve structural strength that promotes long term structural integrity of the sipe protrusion during operation. The increased thickness of above about 0.7 mm for sipe forming protrusions at or near the end faces also provide strength for supporting increased heights, for example, sipe forming protrusions having a height in the range of about 4 mm to about 10 mm, about 5 mm to about 8 mm, or about 6 mm or more.

In one or more embodiments, the edge sipe forming protrusions 10 can selectively have an increased thickness (e.g., in the range of about 0.7 to about 1.2 mm) as compared to one or more other sipe forming protrusions arranged on the inner mold surface away from one or both end faces. For example, the plurality of sipe forming protrusions 10 on the inner mold surface 2 can be grouped into two portions. A first portion is edge forming sipe protrusions positioned at or near one or more end faces of the tire mold segment. The edge forming protrusions can include two categories of sipe forming protrusions. A sipe forming protrusion can have two ends along its length, a first end and a second end. A first category of edge sipe forming protrusions can include a first end or a second end terminates at an end face of the tire mold segment. For example, an edge sipe forming protrusion having an end that terminates at shoulder end face 5a, 5b or a circumferential groove protrusion 6a, 6d. FIG. 2 illustrates an edge sipe forming protrusion 10 positioned in a landing recess and having a first end connected to circumferential groove protrusion 6b and a second end that terminates at mold segment end face 3. Also illustrated is an edge sipe forming protrusion 10 positioned in a landing recess and having a first end connected to circumferential groove protrusion 6c and a second end that terminates near mold segment end face 3.

Edge sipe forming protrusions can also include the category of protrusions having an end that terminates at or near an end face of the tire mold segment and a second end that is not connected to groove forming protrusion or shoulder end face. For example, an edge sipe forming protrusion can have a first end that extends from the inner mold surface (e.g., from a base surface of a land forming recess) and is not connected to or in contact with another mold component (i.e. a free end). The edge sipe forming protrusion having a free end near an end face can have a second end that is connected to or intersects with another protrusion, for example a groove forming protrusion. Alternatively, the edge sipe forming protrusion can have two free ends not connected to or intersecting with another groove forming protrusion. For instance, an edge sipe forming protrusion can be stand in a land forming recess with each end terminating within the land forming recess and not in contact with a groove forming protrusion.

The edge sipe forming protrusion end near an end face of the tire mold segment can be spaced away from end face plane in a range of about 2 centimeters (cm) to about 1 mm, about 1.5 cm to about 2 mm, about 1 cm to about 3 mm, about 75 mm to about 5 mm, or about 60 mm or less, about 50 mm or less or about 40 mm or less. In one or more embodiments, the edge sipe forming protrusions having an end that terminates near an end face can include a first end spaced away from an end face plane of about 1 mm or more, about 3 mm or more, about 5 mm or more, about 10 mm or more, 25 mm or more, about 50 mm or more or about 100 mm or more.

A second portion of the plurality of sipe forming protrusions on the inner mold surface can be interior sipe forming protrusions positioned away from one or more end faces of the tire mold segment (i.e., non-edge sipe forming protrusions). For example, FIG. 2 shows sipe forming protrusions 10 positioned in the land forming recesses located between the two end faces. As shown, the interior sipe forming protrusions are generally designed to have a first and second end that intersects with or is connected to a groove forming protrusion (e.g., 6a, 6b, 6c, 6d). With both sipe protrusion ends supported by another mold component (e.g., a groove forming protrusion), additional support is provided to the protrusion to resist stresses and forces generated during operation.

In some embodiments, the interior sipe forming protrusions can have a width or thickness less than the edge sipe forming protrusions. For example, the interior sipe forming protrusions can have a width of about 6 mm or less, about 5 mm or less, about 4 mm or less or about 3 mm or less, whereas the edge sipe forming protrusions can have a width of about 7 mm or more, about 8 mm or more or about 9 mm or more. In other embodiments, a tire mold segment can have sipe forming protrusions all having about the same width except the sipe forming protrusions that have a portion that terminates with or intersects with an end face of the tire mold segment, which preferably have an increased width. For instance, all of the sipe forming protrusions on an inner mold surface not having an end terminating at or intersecting with a mold end face can have a width of about 6 mm or less, about 5 mm or less, about 4 mm or less or about 3 mm or less, whereas all remaining sipe forming protrusions with an end that intersects with or terminates at a mold end face can have a width of about 7 mm or more, about 8 mm or more or about 9 mm or more. In another example, the remaining sipe forming protrusions having increased width (e.g., having an end that intersects with or terminates at a mold end face) can also include those edge sipe forming protrusions that have an end near an end face. The edge sipe forming protrusions having an end near an end face also can have a width of about 7 mm or more, about 8 mm or more or about 9 mm or more. The edge sipe forming protrusions having an end near an end face can that end spaced away from an end face in the range of about 2 centimeters (cm) to about 1 mm, about 1.5 cm to about 2 mm, about 1 cm to about 3 mm, about 75 mm to about 5 mm, or about 60 mm or less, about 50 mm or less or about 40 mm or less.

The selective use of sipe forming protrusions having an increased width at or near an end face of the tire mold segment provides a robust mold design and allows for high density sipe designs wherein large portions of the sipe forming protrusions can be thinner to produce tires having sipes with reduced width. The sipe at the mold segment part line on a pneumatic tire can have increased depth in addition to being wider as compared to the high density of thinner sipes. For example, the edge sipe forming protrusions with increased width can have a height about the same or the same as the height of the remaining sipe forming protrusions (e.g., interior sipe forming protrusions).

In order to demonstrate the practice of the present invention, the following examples have been prepared and tested. The examples should not, however, be viewed as limiting the scope of the invention. The claims will serve to define the invention.

EXAMPLES

In the following examples, two different tire mold segment designs were used to form two tire designs that were road tested to determine tread wear. The first tire tread design included sipes that all of the same depth and width. The second tire tread design included sipes that were selectively increased in width at or near the mold segment end faces. Both tire designs were road tested for about 19,000 miles.

The first mold segment design contained sipe forming protrusions with the same width and depth at all locations on the mold segment except the cast element sipe protrusions positioned at or near an end face of the mold segment. The sipe forming protrusions of the first mold segment had a depth of 6.6 millimeters and a width of 0.3 millimeters. The cast element protrusions near the end face of the mold segment had a depth of 2.5 millimeters and a width of approximately 0.6 millimeters.

The second mold segment design contained sipe forming protrusions with the same width and depth as in the first mold segment design except that sipe forming protrusions positioned near a mold segment end face or terminated at a mold segment end face had an increased width of 1 millimeter and a depth of 6.6 millimeters.

Figure 3:
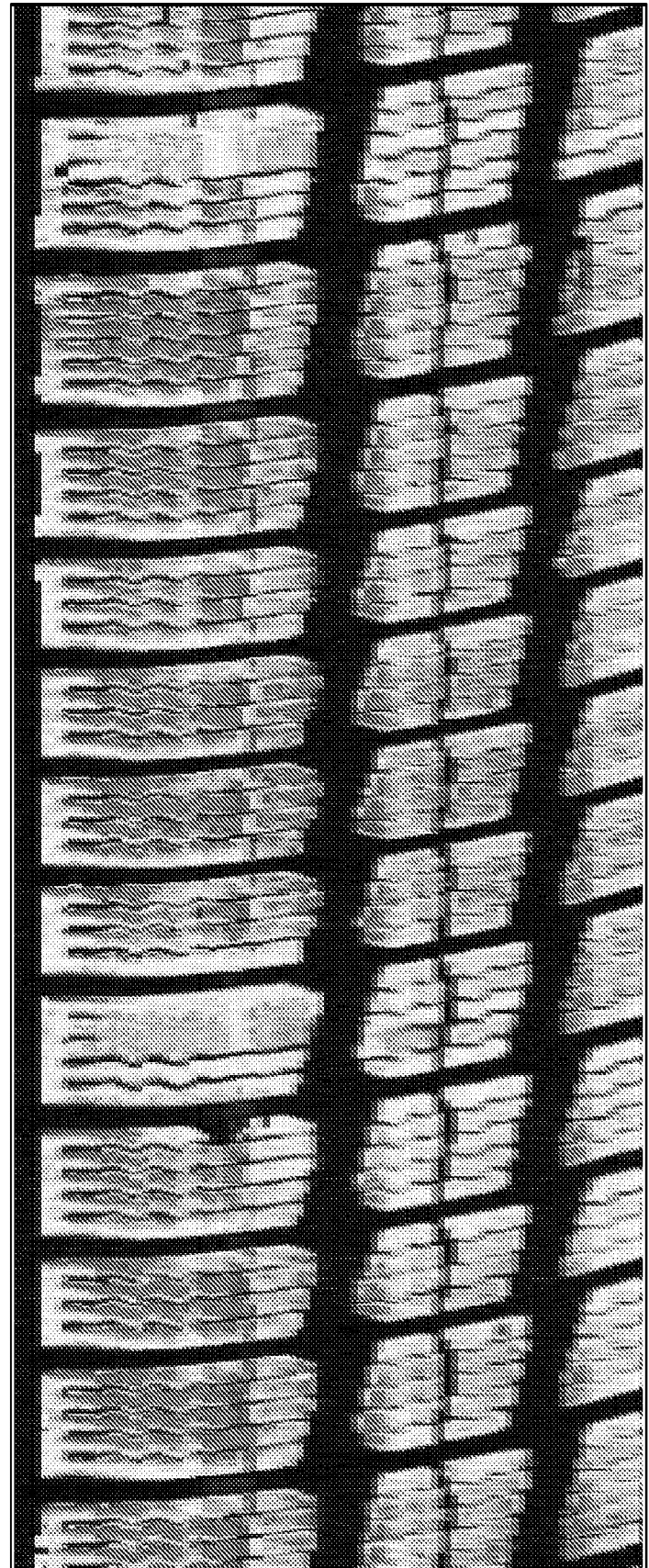
FIG. 3 is a laser scan of the surface profile of a worn tread of a tire prepared with a tire mold segment according to one or more embodiments of the present invention.

FIG. 3 shows a laser scan of the worn tread surface of the first tire tread design with sipes near the end face of the mold segment replaced with 2.5 millimeter depth cast sipe elements. The laser scan shows two areas that were the location of a mold segment part line where two mold segment end faces met. As shown, the tread wear at both of the mold segment part lines was uneven as compared to the remaining tread of the tire. In portions at the mold segment part line areas, the sipes at or near the mold segment end face were worn to the base and formed flat tread surface portions without any groove or sipe indentations. The irregular tread wear as shown can induce harmonic noise during operation or affect tread road grip.

Figure 4:
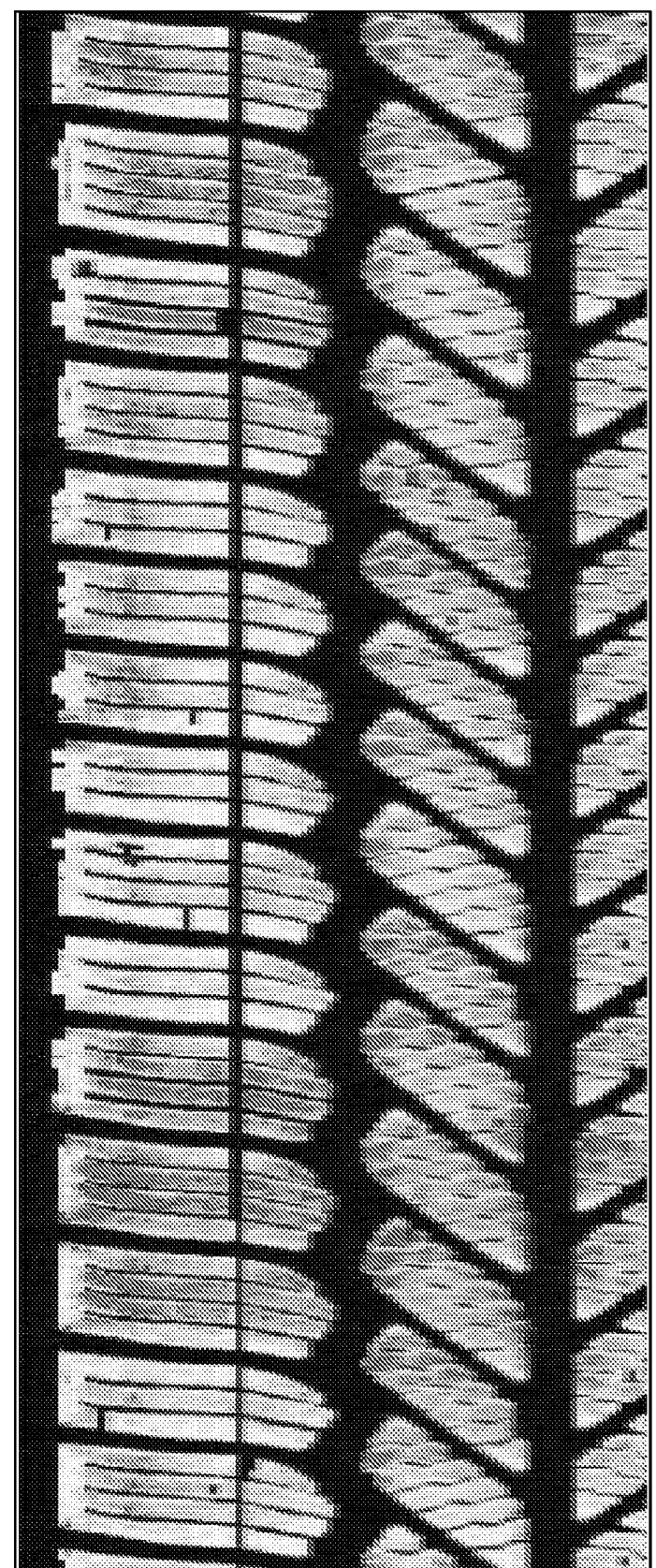
FIG. 4 is a laser scan of the surface profile of a worn tread of a tire prepared with a conventional tire mold segment according to one or more embodiments of the present invention.

FIG. 4 shows a laser scan of the worn tread surface of the second tire tread design with all sipes being of the same depth and width except the sipes at or near a mold segment end face that appear along the mold segment part lines on the tire. The width of the sipes at or near the mold segment end face was selectively increased to avoid the irregular tread wear and provide a more robust tread mold that contained sipe forming protrusions that can withstand the long term operation of the mold. The depth of the sipes at or near the mold segment end face was also increased from 2.5 millimeters to 6.6 millimeters. The laser scan shows two areas that were the location of a mold segment part line where two mold segment end faces met. As shown, the tread wear at both of the mold segment part lines was even as compared to the remaining tread of the tire. The regular tread wear is advantageous for reducing tire noise and providing uniform tread road grip during operation.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A tire mold segment comprising:
   a. an inner mold surface and a first and second mold segment end face, the inner mold surface terminates at the first and second mold segment end faces;
   b. the first mold segment end face and the second mold segment end face comprising a plurality of edge sipe forming protrusions spaced along an entire length of the first mold segment end face and the second mold segment end face, the plurality of edge sipe forming protrusions comprising a width in the range of about 0.7 to about 1.2 mm, the plurality of edge sipe forming protrusions comprising a first end and a second end, the first end of the plurality of edge sipe forming protrusions terminates at the first mold segment end face or the second mold segment face;
   c. a plurality of interior sipe forming protrusions, all of the plurality of interior sipe forming protrusions comprising a width in the range of about 0.6 mm or less.

2. The tire mold segment of claim 1, wherein the plurality of edge sipe forming protrusions comprises a height in the range of about 3 to about 6 mm.

3. The tire mold segment of claim 1, wherein the first end of one of the edge sipe forming protrusions terminates at the first mold segment end face and the second end of the edge sipe forming protrusion terminates into a groove forming protrusion.

4. The tire mold segment of claim 1, wherein all of the edge sipe forming protrusions comprise a width in the range of about 0.7 to about 1.2 mm.

5. The tire mold segment of claim 1, wherein at least one of the plurality of interior sipe forming protrusions comprises a first end and a second end, the first end and the second end terminates into one or more groove forming protrusions.

6. The tire mold segment of claim 1, wherein the inner mold surface further comprises a plurality of land forming recesses, at least one of the plurality of edge sipe forming protrusions is positioned in one of the land forming recesses of the plurality of land forming recesses.

7. The tire mold segment of claim 6, wherein the land forming recess comprises a first border portion that terminates along the first mold segment end face and a second border portion that is formed by a groove forming protrusion.

8. The tire mold segment of claim 7, wherein the first end of one of the plurality of edge sipe forming protrusions terminates at the first mold segment end face and the second end of the edge sipe forming protrusion terminates into the groove forming protrusion that forms the second border portion of the land forming recess.

9. A pneumatic tire comprising a tread surface portion formed by the tire mold segment of claim 1, the tread surface portion comprising one or more mold segment part lines.

10. A tire mold segment comprising:
   a. an inner mold surface and a first and second mold segment end face, the inner mold surface terminates at the first and second mold segment end faces;
   b. the first mold segment end face and the second mold segment end face comprising a plurality of edge sipe forming protrusions, all of the plurality of edge sipe forming protrusions comprising a width in the range of about 0.7 to about 1.2 mm, the plurality of edge sipe forming protrusions comprising a first end and a second end, the first end of the plurality of edge sipe forming protrusions terminates at the first mold segment end face or the second mold segment face;
   c. a plurality of interior sipe forming protrusions, all of the plurality of interior sipe forming protrusions comprising a width in the range of about 0.6 mm or less.

* * * * *